United States Patent [19]

Roberts et al.

[11] Patent Number: 4,875,601
[45] Date of Patent: Oct. 24, 1989

[54] NOZZLE FOR DISPENSING INCREMENTS OF FLOWABLE PRODUCT

[75] Inventors: Gary F. Roberts, Colona, Ill.; Rick A. Meeker, Davenport, Iowa

[73] Assignee: The Kartridg Pak Co., Davenport, Iowa

[21] Appl. No.: 226,615

[22] Filed: Aug. 1, 1988

[51] Int. Cl.⁴ .......................... P67D 5/60; P67D 5/06
[52] U.S. Cl. .................................... 222/145; 222/485; 222/504; 222/555; 222/564; 141/100; 141/286
[58] Field of Search ............... 222/136, 137, 145, 255, 222/459, 504, 485, 555, 547, 564; 99/450.2, 450.6, 450.7; 366/336, 339, 338; 141/286, 100, 99; 239/403, 432

[56] References Cited

U.S. PATENT DOCUMENTS

| 1,303,218 | 5/1919 | Esselmann | 222/485 |
| 2,717,725 | 9/1955 | Bennett | 222/485 |
| 3,106,947 | 10/1963 | Logan | 222/136 |
| 3,252,630 | 5/1966 | Berg | 222/504 |
| 3,587,945 | 6/1971 | Lanatti et al. | 222/561 |
| 3,730,401 | 5/1973 | Bode Jr. | 222/561 |
| 3,779,424 | 12/1973 | Shapland Jr. | 222/561 |
| 4,168,790 | 9/1979 | Lothmann et al. | 222/504 |
| 4,691,627 | 9/1987 | Roberts | 99/450.2 |

Primary Examiner—Joseph J. Rolla
Assistant Examiner—Steven M. Reiss
Attorney, Agent, or Firm—Lockwood, Alex, Fitzgibbon & Cummings

[57] ABSTRACT

A cut-off nozzle for use in dispensing increments of flowable products comprised of a liquid medium in which solids are dispersed, particularly burrito fillings. The cut-off nozzle structure incorporates a light-weight slide member which is shuttled with fast movement between "open" and "close" positions within a chamber having outlet openings in the bottom with which discharge openings in the slide member register or coincide when the slide member is shuttled to its "open" position. The geometry of the chamber-outlet and slide-discharge openings combines with the fast closing action of the slide to provide a sharp positive cut-off of increments of product dispensed from the nozzle with elimination of leakage or drip, plugging and separation of product constituents. The nozzle may be fed with a single stream of product or with two different streams.

13 Claims, 4 Drawing Sheets

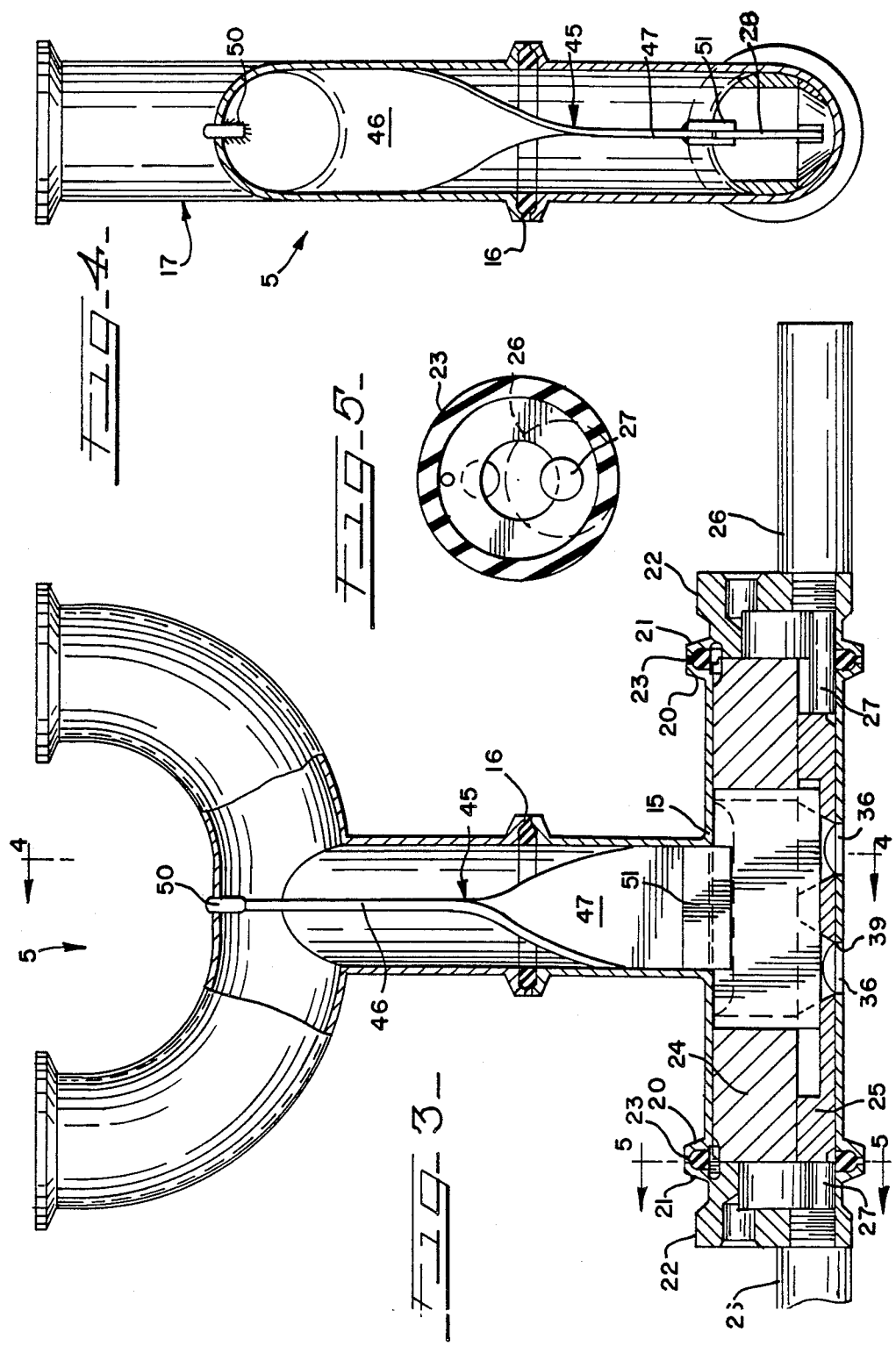

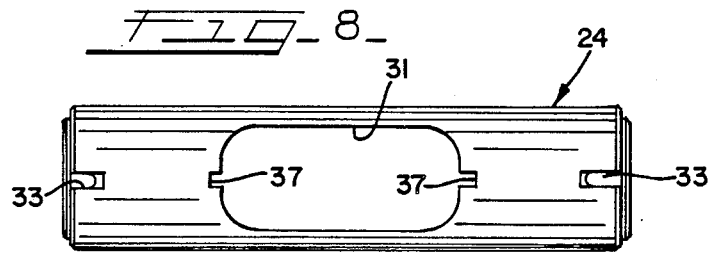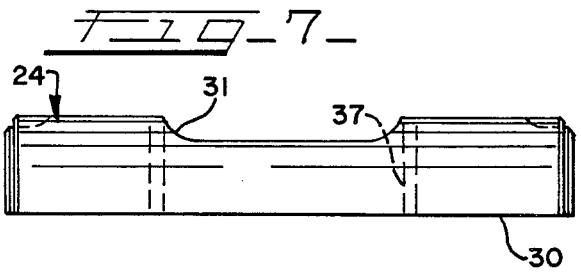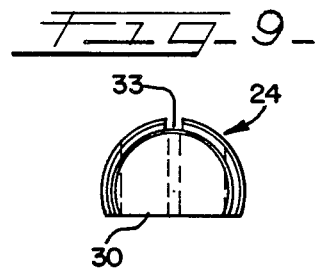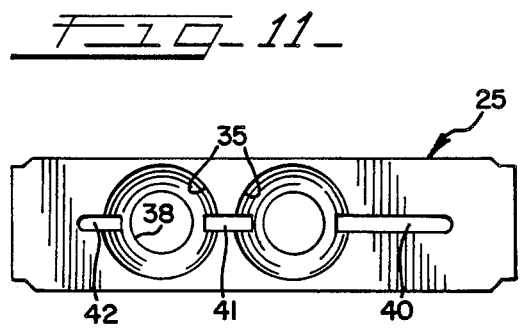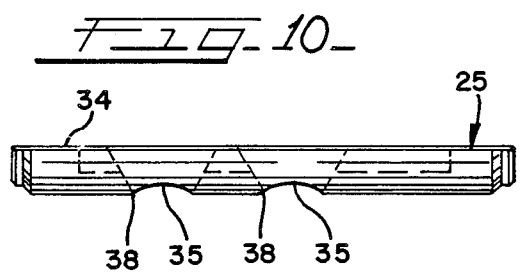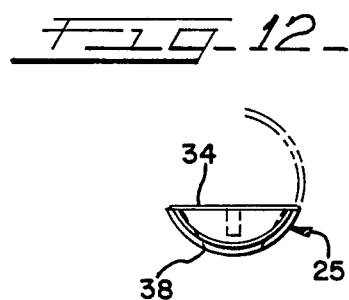

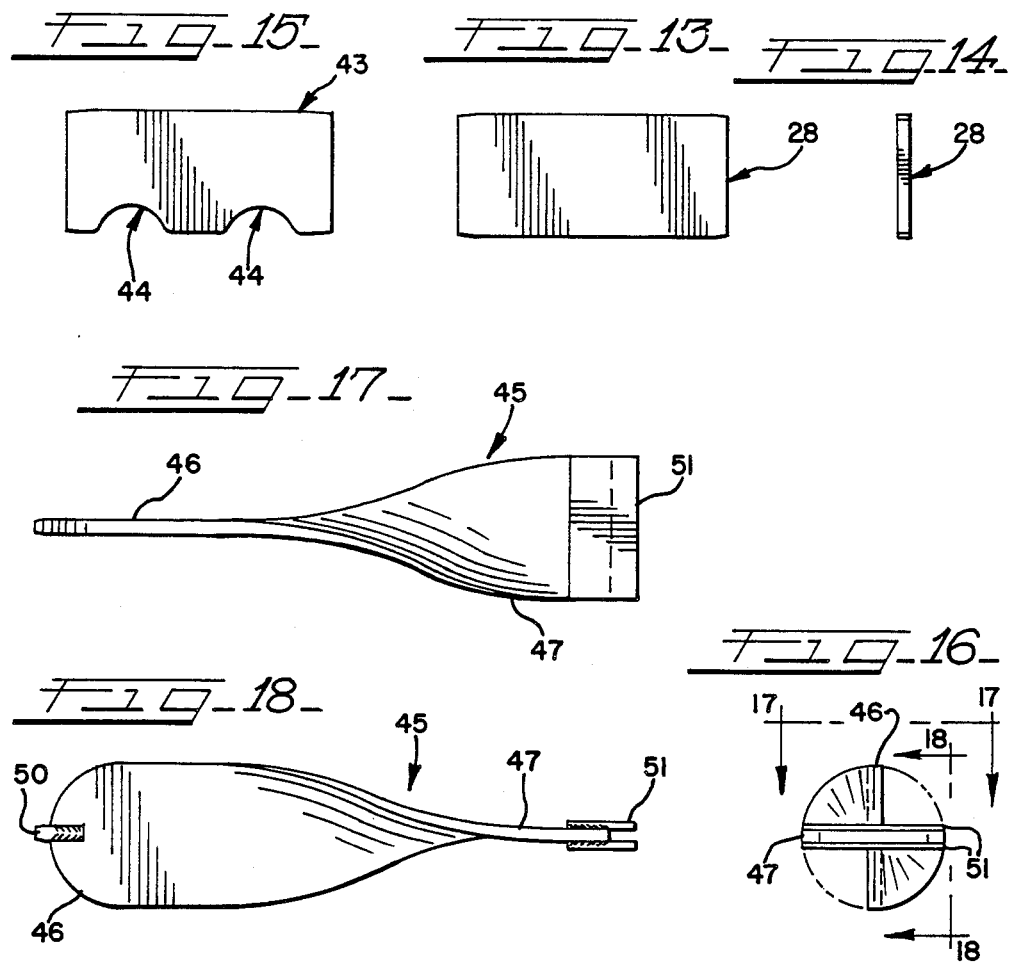

NOZZLE FOR DISPENSING INCREMENTS OF FLOWABLE PRODUCT

This invention relates generally to new and useful improvements in nozzles for use in dispensing increments of flowable mixtures of solids in a suspending liquid, particularly, a low viscosity liquid with a strong tendency to drip. More specifically, the invention relates to such nozzles which are capable of dispensing burrito fillings on tortillas in precisely sized increments and in extended rapid succession.

An expanding market has been developed for prepared burritos packaged in ready to heat and serve form and machines have been developed for use in mass-producing such prepared and filled burritos ready for packaging. Such machines are shown and described in U.S. Pat. Nos. 4,516,487 to Madison et al., 4,638,729 to Woodworth et al.; and 4,691,627 to Roberts.

There are three main operations in the production of filled burritos. First, is the production of the tortilla dough sheets. Second, is the depositing of the burrito fillings on the dough sheets. Third, is the folding of each dough sheet around its filling. The present invention pertains to the second operation and may be considered to be an improvement on the structure and operation of the nozzle for dispensing and depositing tortilla fillings disclosed in the above-mentioned U.S. Pat. No. 4,691,627, the disclosure of which is specifically incorporated herein by reference.

A completely successful burrito filling dispensing nozzle for use with mass or high production prepared burrito making machines needs to meet and fulfill the following requirements:

1. Dispense precise or uniformly sized increments having uniform connection.
2. Have rapid dispensing action with quick or sharp cut-off.
3. Eliminate leaking and dripping between dispensing increments.
4. Eliminate dead pockets and stagnation within the nozzle.
5. Minimize or eliminate adverse pumping effect during cut-off.

From the foregoing, it will be apparent that the object of the present invention, generally stated, is the provision of a new and improved nozzle for use in dispensing flowable mixtures of solids in a suspending liquid, and in particularly burrito fillings.

A further and important object of the invention is the provision of such nozzles which can be used with relatively high speed automated burrito making machines that will dispense onto tortillas precisely sized increments of burrito fillings of uniform composition without intermittent leakage or product hang-on between increments.

Certain other more specific objects of the invention will be apparent from the following detailed description of a presently preferred embodiment taken in conjunction with the accompanying drawings, wherein:

FIG. 3 is an enlargement of FIG. 2, partly broken away and partly in vertical section;

FIG. 4 is a vertical sectional view taken on line 4—4 of FIG. 3;

FIG. 5 is a detailed sectional view taken on line 5—5 of FIG. 3;

FIG. 7 is a side elevation of a plug member forming one of the parts of the nozzle structure shown in FIGS. 3 and 6;

FIG. 8 is a top plan view of the plug shown in FIG. 7;

FIG. 9 is an end elevational view of the plug shown in FIG. 7;

FIG. 10 is a side elevation of the slide forming one part of the nozzle structure shown in FIGS. 3 and 6;

FIG. 11 is a top plan view of the slide shown in FIG. 10;

FIG. 12 is an end elevational view of the slide shown in FIG. 10;

FIG. 13 is an elevational view of a separator or divider forming a part of the nozzle structure of FIGS. 3 and 6;

FIG. 14 is an end elevational view of the divider shown in FIG. 13;

FIG. 15 is a side elevational view of a modified form of the divider shown in FIG. 13;

FIG. 16 is a bottom end view of a twist member forming one part of the nozzle structure of FIGS. 3 and 6;

FIG. 17 is an elevational view taken on line 17—17 of FIG. 16; and

FIG. 18 is an elevational view taken on line 18—18 of FIG. 16.

Figure 1:
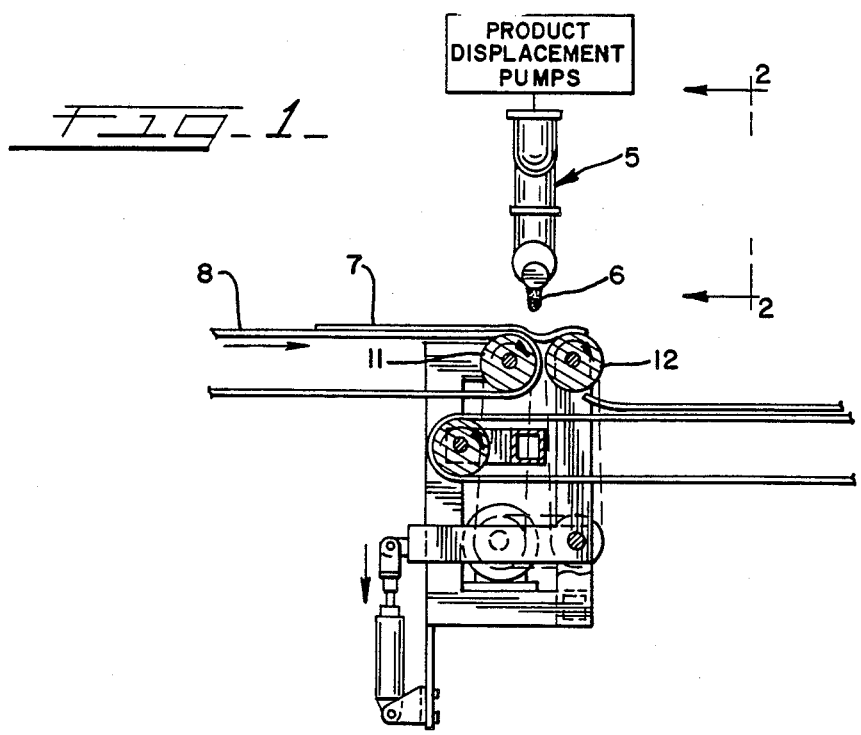
FIG. 1 is a fragmentary, partially diagrammatic side elevational view showing a dispensing nozzle of the present invention in relationship to the station of a known burrito making machine in which the fillings are deposited on the tortilla dough sheets.

FIG. 1 corresponds generally to FIG. 4 of the above-mentioned U.S. Pat. No. 4,691,627 with the difference being in the dispensing nozzle indicated generally at 5. Nozzle 5 is substantially different from nozzle 31 of U.S. Pat. No. 4,691,627 in that it has cut-off features which were not present in nozzle 31.

The nozzle 5 functions to deposit in rapid succession precise or uniformly sized increments 6 of burrito fillings onto tortilla dough sheets 7. The dough sheets 7 are delivered by a conveyor 8 in rapid succession to the position shown in FIG. 1 wherein the leading portion of the dough sheet rests on two rollers 11 and 12. The roller 12 is a reversible drive roller in that it rotates in the same direction as the roller 1 as each dough sheet 7 is brought into the position shown in FIG. 1. Thereafter, the roller 12 rotates in the opposite (counterclockwise) direction while it is swung a short distance away from roller 11 as illustrated in FIG. 5 of U.S. Pat. No. 4,691,627. This action allows a crease or fold to form in the leading portion of the dough sheet 7 and for the burrito filling increment 6 to be deposited into that crease or fold. Thereafter, the dough sheet 7 with its deposit of burrito filling leaves the station of the machine shown in FIG. 1 and proceeds to additional stations in which the folding of the tortilla dough sheet 7 around the filling is completed. These additional folding operations are disclosed for example in the above-mentioned U.S. Pat. Nos. 4,516,487 and 4,638,729. Reference may now be had to FIGS. 2–18 for a detailed description of the nozzle 5 and its mode of operation.

Figure 2:
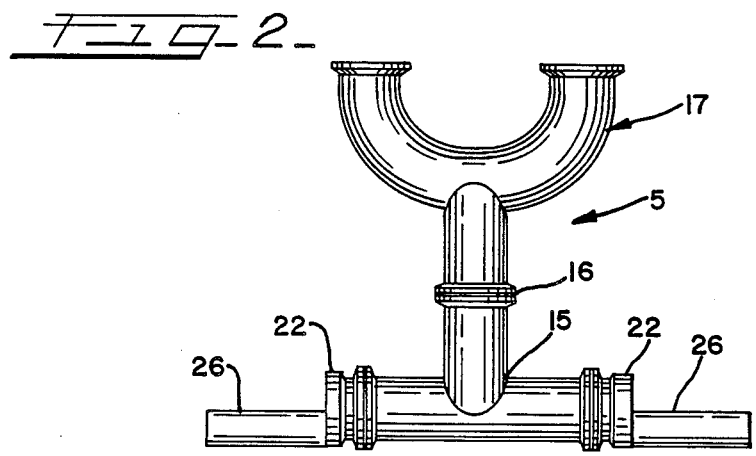
FIG. 2 is a side elevational view taken on line 2—2 of FIG. 1 of the dispensing nozzle structure.

The body and main structure of the nozzle 5 is shown in FIGS. 2–4 wherein the nozzle body is indicated at 15 and is in the form of an inverted tee-fitting. The upper end of the vertical leg is connected by a leak proof joint 16 of known type to the lower end of a bifurcated or Y-shaped fitting indicated generally at 17. One branch of the fitting 17 will be connected to a displacement pump which feeds one type of material while the other leg is connected to another displacement pump which feeds a different type of material. The two types of materials are dispensed from the nozzle 5 as increments of a burrito filling of uniform composition in a manner that will be hereinafter described.

The horizontal portion or leg of the nozzle body 15 is cylindrical and provided on opposite ends with flanges 20—20. These flanges mate in sealed or fluid-type relationship with flanges 21—21 on end fittings 22—22 with gaskets 23—23 being captured between the opposing flanges. Approximately ⅔ of the cylindrical chamber within the horizontal leg of the body 15 is occupied by a stationary plug member 24 (FIGS. 7-9) while the remaining ⅓ portion of the cylindrical chamber which is below the plug 24 is occupied by reciprocating slide or shuttle 25 (FIGS. 10-12).

The end fittings 22 in addition to closing the opposite ends of the nozzle body and retaining the plug 24 and shuttle 25 therein also serve as supports for a pair of small air cylinders 26—26. The inner ends of the piston rods 27—27 of cylinders 26 engage opposite ends of the shuttle 25.

Referring to FIGS. 7-9, the plug 24 is in the form of a solid cylindrical body with approximately the lower ⅓ removed so at to leave a horizontal flat side 30. An elongated vertical opening 31 extends through the central portion of the plug 24.

The plug 24 is maintained in its proper oriented position within the cylindrical chamber of the tee-fitting 15 by means of pins 32—32 (FIG. 6) which are press-fitted into the end fittings or caps 22. The projecting ends of the pins 32 fit in part in grooves 33—33 formed in the top of the opposite ends of the plug 24 and in part in opposing slots or grooves formed in the opposite ends of the tee 15.

Figure 6:
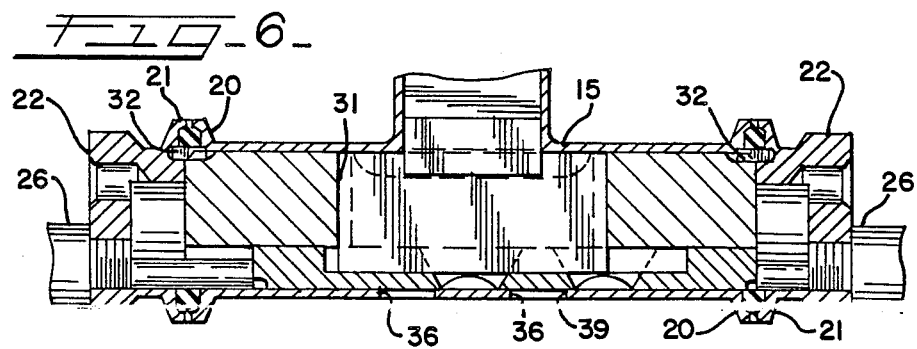
FIG. 6 is a fragmentary sectional view corresponding to a portion of FIG. 3 and showing the slide element in its "closed" position.

Referring to FIGS. 10-12, the reciprocating slide or shuttle 25 has a flat upper side or surface 34 which mates with and has sliding engagement with the flat bottom surface 30 of the plug 24. Intermediate its ends the shuttle 25 is provided with two inverted frusto-conical openings 35—35 with the upper circular end of each opening positionable underneath one of the opposite ends of the opening 31 in the plug 24 when the shuttle 25 is in its open position as shown in FIG. 3. The smaller bottom end of each opening 35 is registrable with one of the two openings 36—36 (FIGS. 3 and 6) when the shuttle 25 is in its open position as shown in FIG. 3. When the shuttle 25 is in its closed position as shown in FIG. 6, the lower ends of the openings 35 are shielded or closed by the opposing body portion of the tee-fitting 15 as shown in FIG. 6.

In order to partition the opening 31 in the plug 24 and the frusto-conical holes or openings 35 in the shuttle 25 into two sides or two halves, a baffle 28 (FIGS. 13 and 14) is provided. The opposite ends of the baffle 28 fit in the vertical grooves 37—37 (FIGS. 7 and 8) at opposite ends of the plug opening 31. The bottom edge of the baffle 28 extends down into the aligned slots or grooves 40, 41 and 42 (FIGS. 10 and 11) in the upper side of the shuttle 25.

When burrito fillings are being dispensed which contain large lumps it has been found desirable to use a vertical baffle 43 (FIG. 15) the bottom edge of which is provided with arcuate openings 44—44 which accommodate the large lumps. In order to maintain the incoming streams of filling ingredients separate as they are delivered to the opening 31 in the plug 24, a baffle 45 (FIGS. 3 and 4) is provided which has a 90° twist so as to have an upper portion 46 and a lower portion 47. The twist baffle 45 is shown in additional detail in FIGS. 16-18. The upper end of the upper portion 46 is arcuate so as to mate with the upper interior of the central portion of the Y-shaped fitting 17. The apex of the upper end 46 has a retainer pin 50 welded thereto which protrudes into a hole of the Y-shaped fitting 17 (FIGS. 3 and 4).

The bottom end of the lower portion 47 of the twist baffle 45 is squared off so as to engage and fit against the upper edge of the baffle 36 (or 43) as shown in FIGS. 3 and 4. Adjacent its opposite edges, the lower squared off end is provided with a pair of spaced guides 51—51 which straddle the upper edge of the baffle 36.

It has been found important that the bottom corners 38 (FIGS. 10-12) at the bottom of each frusto-conical opening 35 be in the form of a sharp edge and that the upper corners 39—39 (FIGS. 3 and 6) of the openings 36 in the cylindrical wall of the body also be sharp. The interaction of these sharp edges 38 and 39 is such as to assist in preventing leakage and dripping when the shuttle 25 is moved to its cut-off and/or closed position. The interaction of the sharp edges will also cut through solid particles that may get trapped in the openings 36. The abrupt closing action of the shuttle and resultant impacts also serves to dislodge any product which may tend to hang onto the bottom of the body 15.

In operation, it will be appreciated that the actuation of the displacement pumps which deliver fluid filling material to opposite legs of the Y-fitting 17 and the air cylinders 26 which actuate the shuttle 25 are coordinated with each other and also with the conveyor mechanism which delivers the dough sheet tortillas 7 and the actuation of roller 12. This timed operation can be achieved in known manner. In each operation, the displacement pumps deliver metered quantities of filling material to the Y-fitting 17, and the right hand air cylinder 26 (FIG. 3) is actuated so as to quickly move the shuttle 25 to its open position (FIG. 3) allowing the filling material to be discharged through the frusto-conical openings 35. As soon as the metered amount of filling has been discharged from the nozzle 5, the left hand cylinder 26 rapidly moves the shuttle 25 to its closed position (FIG. 6) simultaneously retracting with the aid of an enclosed spring the extended piston rod 27 of the opposing single-acting, spring-return air cylinder 26.

The importance of having the frusto-conical openings 35 and their upwardly and outwardly sloping sides is due to the upward shoving, pumping or impacting action which the inclined surfaces impart to the filling material residing in the frusto-conical openings each time the shuttle 25 is actuated to its closed position. This upward motion counteracts the downward pressure or pumping action on the filling material in the openings thereby assisting in preventing dripping or leakage of filling material during each closing of the shuttle.

Certain burrito fillings do not have to be delivered in separate streams to the dispensing nozzle in which cases the Y-shaped fitting 17 can be omitted and the vertical leg of the tee-fitting 15 can be directly connected with the discharge connection of the single product displacement pump. With a single incoming stream of filling material to the nozzle 15 there is no requirement for either the vertical baffle 36 or the twist baffle 45. Further, if desired, the plug 24 can be replaced with a plug which does not have the vertical grooves 37 at the opposite ends of the central opening 31 therein and the shuttle 25 can be replaced with a shuttle that does not have the baffle receiving grooves 40, 41 and 42 in the upper flat surface thereof.

It will be appreciated that those skilled in the art will be able to make various changes and modifications in the apparatus shown in the drawings and described above. Thus, instead of having two nozzle outlets 35—35/36—36, there could be only one outlet or there could be three or more outlets.

Further, in the case of multiple openings, the outlet openings could have different sizes.

Instead of using two small air cylinders 26, a single double-acting cylinder can be used at one end of the tee 15.

What is claimed is:

1. A nozzle for dispensing predetermined increments of a flowable mixture of solids in a fluid comprising, a nozzle body in the form of an inverted tee pipe fitting having at least one nozzle-outlet opening in its underside and located inwardly from the ends of the horizontal leg, a stationary plug occupying the upper-half and also a portion of the bottom-half of the interior of said horizontal leg, a slide occupying this remaining space in said interior bottom-half not occupied by said plug and shuttleable between an "open" position and a "close" position and having a slide-discharge opening therein for and which registers with each one of said nozzle-outlet openings when said slide is in its said "open" position, and said slide closing each said nozzle-outlet opening when in its said "close" position, and means operatively connected with said slide for shuttling it between its said "open" and "close" positions, and said plug having an elongated vertical opening therethrough overlying and registering with said one or more nozzle-outlet openings and said one or more slide-discharge openings when said slide is in its said "open" position.

2. The nozzle called for in claim 1 wherein each said slide-discharge opening is flared outwardly in an upward direction so as to impart an upward impact on material remaining within said opening when said slide is moved to its said "close" position.

3. The nozzle called for in claim 1 wherein the bottom surface of said plug and the top surface of said slide are planar with sliding engagement therebetween.

4. The nozzle called for in claim 1 wherein each said slide-discharge opening is inverted frusto-conical in shape and the bottom-most edges thereof are sharp corners.

5. The nozzle called for in claim 1 wherein said means for shuttling said slide comprises an air cylinder mounted on each end of said horizontal leg of said nozzle body with the distal end of the piston rod of each cylinder extending into pushing engagement with the adjacent end of said slide, said air cylinders being alternately actuated to shuttle said slide between its said "open" and "close" position.

6. A nozzle for dispensing predetermined increments of a flowable mixture of solids in a fluid comprising, a nozzle body in the form of an inverted tee-fitting with at least one nozzle-outlet opening in its underside and located inwardly from the opposite ends of its horizontal leg, a Y-shaped feed fitting having the bottom end of its vertical leg mounted on the upper end of the vertical leg of said tee-fitting, a stationary plug occupying the upper-half and also a portion of the bottom-half of the interior of said horizontal leg, a slide occupying the remaining space in said interior bottom-half not occupied by said plug and shuttleable between an "open" position and a "close" position, actuating means operatively connected with said slide for shuttling it between its said "open" and "close" positions, said slide having a slide-discharge opening therein for and which registers with each one said nozzle-outlet openings when said slide is in its said "open" position and said slide having solid portions which overlie and close each said nozzle-outlet opening when said slide is in its said "close" position, said plug having an elongated opening therein opposite ends of which overlie said one or more slide-discharge openings when said slide is in its said "open" position, and baffle means dividing said elongated opening in said plug and the interiors of said vertical leg of said tee fitting and the vertical leg of said Y-fitting into two separate flow paths.

7. The nozzle called for in claim 6 wherein said baffle means comprises a vertical divider plate in said elongated opening in said plug and a divider strip extending upwardly from said divider plate.

8. The nozzle called for in claim 7 wherein the bifurcated portion of said Y-fitting is aligned parallel with said horizontal leg of said tee-fitting, and said divider strip has a 90° twist in it intermediate its opposite ends.

9. The nozzle called for in claim 7 wherein the bottom edge of said vertical divider plate extends into receiving slots in the top of said slide.

10. The nozzle called for in claim 7 wherein the bottom edge of said vertical divider plate has a recess therein which is aligned with one of said slide-discharge openings when said slide is in its said "open" position.

11. The nozzle called for in claim 6 wherein each said slide-discharge opening is inverted frusto-conical in shape and the bottom-most edges thereof are sharp corners.

12. The nozzle called for in claim 6 wherein said means for shuttling said slide comprises an air cylinder mounted on each end of said horizontal leg of said nozzle body with the distal end of the piston rod of each cylinder extending into pushing engagement with the adjacent end of said slide, said air cylinders being alternately actuated to shuttle said slide between its said "open" and "close" position.

13. The nozzle called for in claim 6 wherein the bottom surface of said plug and the top surface of said slide are planar with sliding engagement therebetween.

* * * * *